April 29, 1969
C. K. STEDMAN
3,440,872
STRAIN GAGE ASSEMBLY INVOLVING CLAMPED BEAM WITH PLANAR STRAIN
GAGE MOUNTING SURFACE AND OPPOSITELY INFLECTED STRAIN GAGES
Filed Nov. 10, 1966
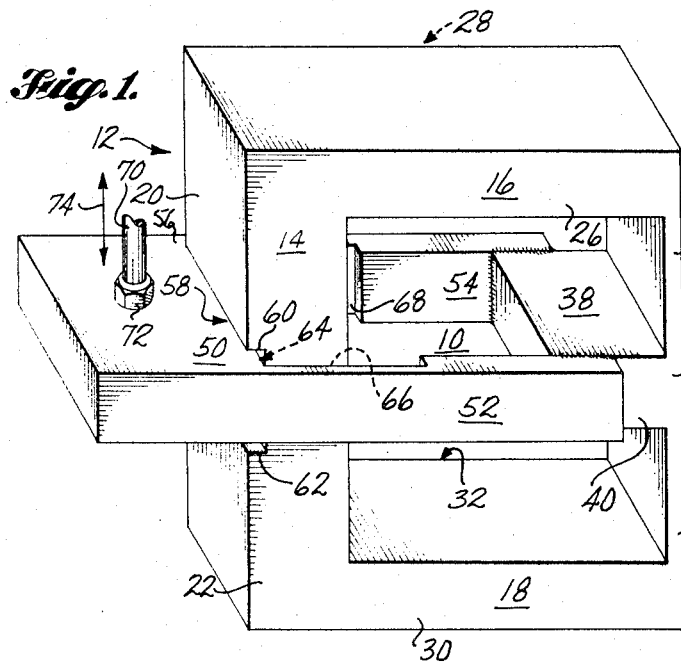
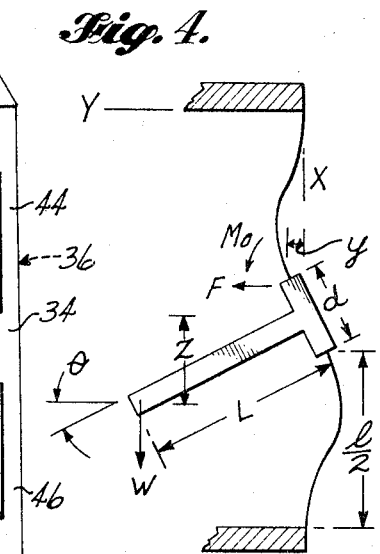
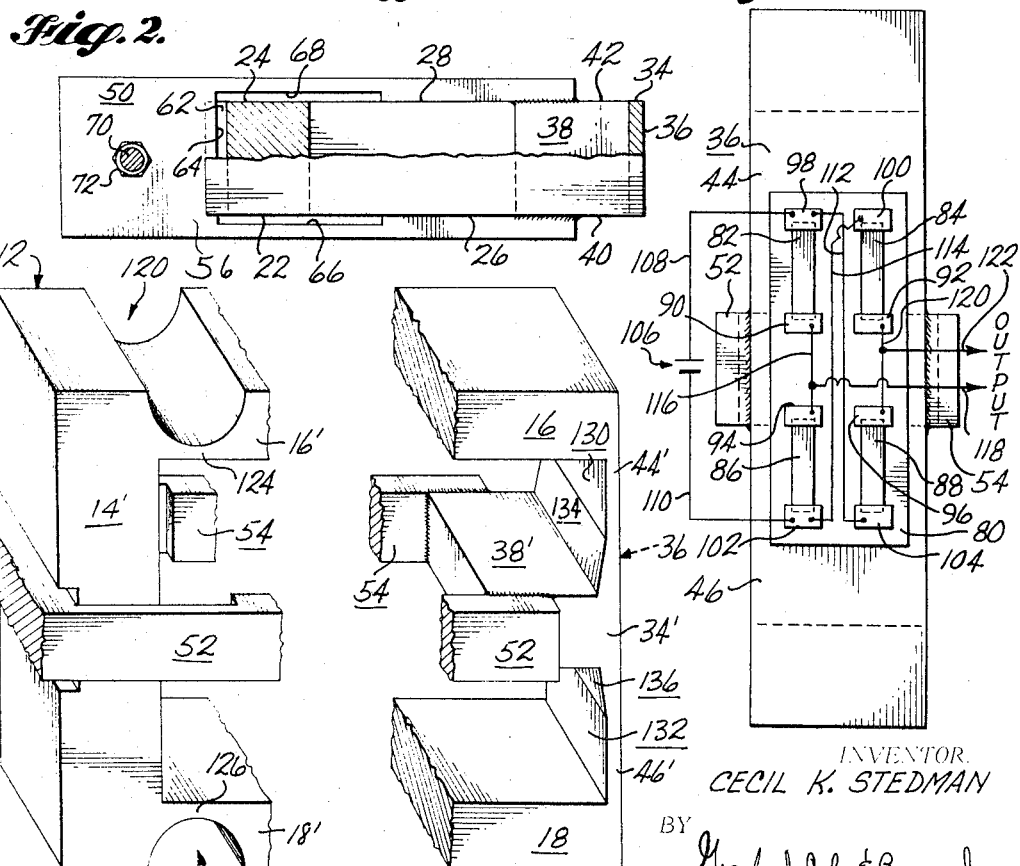
INVENTOR.
CECIL K. STEDMAN
BY Graybeal, Cole & Barnard
ATTORNEYS

United States Patent Office 3,440,872
Patented Apr. 29, 1969

3,440,872
STRAIN GAGE ASSEMBLY INVOLVING CLAMPED BEAM WITH PLANAR STRAIN GAGE MOUNTING SURFACE AND OPPOSITELY INFLECTED STRAIN GAGES
Cecil K. Stedman, Issaquah, Wash., assignor to Statham Instruments, Inc., Los Angeles, Calif., a corporation of California
Filed Nov. 10, 1966, Ser. No. 593,447
Int. Cl. G01l 5/18
U.S. Cl. 73—141                                17 Claims

ABSTRACT OF THE DISCLOSURE

Strain gage assemblies involving fully clamped beam with central boss and separated flexural portions, a planar strain gage mounting surface being provided on one face of the beam, with electroconductive bridge elements bonded to the separated flexural portions of the beam. Loading is applied to the clamped beam through the boss to twist the boss and oppositely inflect the separated flexural portions of the beam and thus produce opposite stress patterns in the bridge elements. Bridge elements are preferably fabricated of simultaneously deposited semiconductor (e.g. Si-Cr) films. Constructional variations are presented for increasing the linear response range of the instrument, either by (a) relieving stretch induced nonlinearity of the beam, or (b) by employment of beam flexural portions of varying (e.g. tapered) thickness.

Summary of the invention

The present invention relates to improvements in strain sensitive devices of the type commonly known as transducers or strain gages, and more particularly relates to improvements in flexural mounting means for the strain sensitive electroconductive (e.g. piezoresistive) elements, commonly known as bridge "arms," wherein the flexural mounting means is in the form of a clamped beam and the bridge arm mounting surface is essentially planar when non-stressed and is oppositely inflected under stress so that bridge elements on flexural segments of the clamped beam undergo both tensional and compressional strain. By such arrangement, the strain induced change in resistance of the bridge arm means in one portion of the clamped beam is opposite to the strain induced change in resistance of the bridge arm means in the other portion of the beam and the sensitivity of the Wheatstone bridge circuit is thereby increased.

Another important aspect of the present invention is that the doubly inflected flexural surface of the clamped beam is essentially planar, making it practical for the electroconductive bridge elements thereon to be of the deposited film type and formed simultaneously (as by known techniques such as deposition by vacuum evaporation, such as disclosed in my prior patent, No. Re. 25,924) in order that the bridge arms have electrical characteristics which are as closely matched as possible. Heretofore, when design considerations have dictated use of a beam type flexural member as the mechanism for inducing strain in electroconductive bridge arms, it has been common practice to employ a simple cantilever beam (i.e. a beam clamped at one end only) and either provide electroconductive elements on only one surface of the beam to provide a two-arm bridge, or to provide electroconductive elements on opposite sides or surfaces of the beam in order to obtain a four-arm bridge circuit, such as shown in my copending application Serial No. 567,291, filed July 22, 1966, and entitled Square Root Responsive Pressure Transducers. However, because each bridge arm mounting surface of a simple cantilever beam is characteristically stressed only tensionally or only compressionally under a given direction of loading of the beam, it has not been considered practical to utilize a cantilever beam type flexural mounting means for bridge arms when it is desired to employ deposited film type bridge arms and when it is also desired to have a four-arm type bridge, because simultaneous deposition of the bridge arms cannot be effected on opposite surfaces of the beam.

It is accordingly a basic object and feature of the present invention to provide a beam type flexural mounting means for electroconductive elements of the deposited film type, wherein a single, substantially planar mounting surface is available for simultaneous electrodeposition of the bridge arms, and wherein the bridge arm mounting surface under loading is doubly inflected so that one portion of the bridge arm mounting surface is stressed tensionally and another portion thereof is stressed compressionally under a given direction of loading. It is a further object and feature of the present invention to provide a doubly inflected beam type flexural mounting surface for piezoresistive strain gages, wherein the beam is fully clamped by associated, essentially rigid structure, and such associated structure is configured to provide mechanical stop means for the lever arm associated with the beam, the beam configuration in this respect having a central boss rigidly connected to a lever arm having but a limited degree of movement with respect to the beam clamping structure.

Other objects, features and characteristics of the present invention relate to design variations in a fully clamped, doubly inflected beam type bridge arm structure having a single bridge arm mounting surface, whereby thickness variations in the flexural segments of the beam and thickness variations in the associated beam clamping structure are employed to optimize the operating characteristics of the assembly.

Typical mechanism embodying the invention, as hereinafter more specifically described, is comprised of a generally rectangular body or frame, in which the supporting parts for the beam are a base portion and two clamp arms extending generally outwardly at right angles therefrom and joined by a base portion in spaced relationship to the beam. The beam extends between the outer ends of the clamp arms and comprises flexural segments which are considerably thinner than either the base or arms of the frame. The inside surface of the beam has a boss or like rigid portion located generally centrally of the beam and extending toward the frame base. Strain gage means are bonded on the flat surface of the beam opposite the surface on which the boss or stub paddle is formed. As a practical matter, it is desirable that the frame body and beam be formed of an integral piece of appropriate metal such as 410 stainless steel.

The frame body and beam are suitably of approximately the same width. A generally U-shaped lever arm is attached to the end surfaces of the boss in such a way that the lever arm passes around the frame base portion and provides an external loading point outside the frame base.

The frame base is preferably notched on the outer surface to accommodate the inner marginal portion of the lever arm, thus in effect creating stop surfaces for the lever arm. The extension arm is also dimensioned near the frame base portion to provide stop surfaces limiting the amount of movement of the lever arm in a direction transversely of the frame base portion.

In the illustrated form of the invention, force is applied to the lever arm to exert a moment about an axis substantially in the strain gage mounting surface of the beam and extending transversely of the beam and such loading generates a moment on the beam resulting in a compound or double inflection of said beam. Such double inflection of the beam is in the nature of a symmetrical S-curve with essentially equal and opposite curvatures. The strain gages themselves are located or positioned on the flat outer surface of the beam, preferably in the areas of maximum stress.

Another feature of this arrangement is that the flexed surface can be counterbalanced with respect to "g" forces parallel with the axis of the transducer diaphragm. Another feature is that the instrument can be designed so that the flexed surface is insensitive with respect to "g" forces normal to the strain gages since said gages are energized in the same direction and thus no unbalance is generated in the bridge network.

Other objects, features and advantages of the invention will be apparent from the following more detailed description of certain typical forms thereof, considered in conjunction with the accompanying drawings, which are drawn substantially to scale, with like letters and numerals referring to like parts and prime numerals referring to similar parts.

*Description of the drawings*

FIG. 1 is an enlarged perspective view of a typical form of doubly inflected clamped beam according to the invention;

FIG. 2 is an elevational view as taken from one of the sides of the structure shown in FIG. 1, with a portion broken away to further illustrate the relationship of the extension arm and handle portions as attached to the boss or stub paddle;

FIG. 3 is an enlarged, end elevational view of the beam shown in FIGS. 1 and 2, showing the outer surface or face of the beam and further illustrating a typical positioning of the strain gages on the gage mounting surface of the beam;

FIG. 4 is an exaggerated, schematic representation illustrating the nature of the double inflection of the beam under loading;

FIG. 5 is a partial, perspective view illustrating a modified form of construction, with notches in the beam clamping arms near the frame; and FIG. 6 is a partial, perspective view illustrating a further modified form of construction, with the flexural segments of the beam of non-uniform thickness.

*Detailed description*

Referring now to the drawings, it will be seen that the illustrated clamped beam type assembly generally designated by the number 10, has a frame body generally referred to by number 12. The frame body is generally block shaped and formed to include a base portion 14 and beam clamping arm portions 16 and 18, with base portion 14 and the arm portions 16 and 18 being relatively rigid.

Frame base portion 14 comprises an outer surface 20 and side surfaces 22 and 24, and arm 16 comprises edge or face surfaces 26 and 28, while arm 18 comprises edge or face surfaces 30 and 32.

The clamped beam, generally designated at 34, spans the outer ends of support arms 16 and 18. Characteristic of the invention, beam 34 includes an outer, substantially planar strain gage mounting surface 36. The inside surface of beam 34 is formed with a central, relatively stiff, generally rectangular boss or stub 38, comprising side surfaces 40, 42. Two relatively thin segments 44, 46 lie on either side of the boss 38 and constitute the flexural portions of the clamped beam 34.

Attached to boss 38 and extending toward frame base portion 14 and around the edge surfaces of said base portion is a relatively rigid force applying lever arm means or "handle", generally designated at 50. Lever arm means 50 is a U-shaped element having boss extension arms 52 and 54 which are rigidly secured to the mounting edges or faces 40 and 42 of boss 38, as by weldments, as shown. The boss extension arms 52, 54 extend outwardly beyond the outer surface of base portion 14. It will be noted that base portion 14 has a transversely extending rectangular notch 58 providing stop surfaces 60 and 62, and that the inner surfaces 64 of lever arm 50 lies within the notch 58 in spaced relation to the notch floor. Notch 58 is of predetermined dimensions so that stop surfaces 60 and 62 are spaced from handle portion 56 to allow limited movement of lever arm means 50 to twist boss 38 and thus oppositely inflect the beam segments 44, 46. Extension arms 52 and 54 are also provided with notches, to form stop surfaces 66 and 68 which permit only a limited extent of lateral movement of the lever arm means 50. In the construction shown, said stop surfaces 66, 68 are provided only to protect the assembly from damage in the event a moment is applied edgewise of the lever arm means 50. Normal operational movement of such lever arm means 50 involves application of a moment sidewise of the lever arm means 50, through a loading means coupled to a pressure sensitive diaphragm or the like, such as linkage rod 70, suitably in threaded engagement with the lever arm means 50 and with retainer nut 72. As will be apparent, such loading means moves the lever arm means 50 shown in FIGS. 1 and 2 in a direction generally parallel to the strain gage mounting surface 36 of the clamp beam 34, which direction is shown in FIG. 1 by the arrow designated 74. As will also be understood, loading of the lever arms means 50 through axial movement of the rod 70, results in a twisting action on the boss 38 and generation of a moment in the beam 34 which acts about an axis lying substantially in and extending transversely of the beam 34, producing opposite inflections in the separated flexural portions 44, 46 of the beam, and opposite stress patterns in the strain sensitive electroconductive elements bonded to such flexural beam segments 44, 46, as discussed in more detail below.

As will be readily understood, the linkage rod 70, as fragmentarily shown in FIGS 1 and 2, is of a type generally conventional per se for transmitting pressure responsive movement from a pressure sensing element such as a diphragm to a strain sensitive assembly. By way of similar example, it will be noted that my copending application 567,291, filed July 22, 1966, and entitled, Square Root Responsive Pressure Transducers, discloses pressure transducer assemblies with similar loading arm means 100, 144 which are moved axially by a pressure responsive element and in turn flexes a beam type structure on which strain gage means are mounted (the beam type structure in the instance of said application 567,291 being simply a cantilever type beam).

Planar surface 36 of beam 34 has bonded thereto an insulative substrate 80 (such as SiO film, as disclosed in my prior U.S. Reissue Patent No. 25,924), on which are bonded four bridge arms in the form of strain sensitive, electroconductive deposited film (suitably composed of 50% Si-50% Cr, to a film thickness of 100–500 angstroms, such as disclosed in my said prior U.S. Reissue Patent No. 25,924). As shown in FIG. 3, each of such bridge arms, 82, 84, 86, 88 overlies portions of the flexural segments 44 (in the case of arms 82, 84) and 46 (in the case of arms 86, 88) adjacent to the boss 38 so that strain is induced therein upon application of a loading moment to the boss 38.

By a deposition technique also known per se, such as disclosed in my U.S. Patent 3,303,693, entitled Arm Type Film Bridge With Minimal Thermal Zero Shift, granted Feb. 14, 1967, deposited film type conductor tabs or "patches," (suitably of chromium deposited to a film thickness of about 100–500 angstroms) overlie the ends of the semi-conductor electroconductive elements 82–88, the respective inboard conductor patches 90, 92, 94, 96 being placed to also overlie the boss 34 and thereby not be subjected to substantial stress upon flexure of the beam 34, and the respective conductor patches 98, 100, 102, 104 being placed at the outboard ends of the electroconductive elements 82–88 at points on the surface of the flexural segments 44, 46 which are substantially equidistant from the juncture of such segments with the boss 38, and which are preferably but not necessarily near the stress null zones of the mounting surface 36.

In a manner conventional per se, as shown at FIG. 3, the various electroconductive elements 82, 88 are electrically connected to form a four-arm Wheatstone bridge circuit, such circuit being shown schematically as including a suitable power source such as battery 106, connected across conductor tabs 98 and 102 by respective conductor wires 108, 110, the conductor tab 98 being electrically interconnected with conductor tab 104 by conductor wire 112, and the conductor tab 102 being electrically interconnected with conductor tab 100 by conductor wire 114. Completing the Wheatstone bridge circuit, the conductor tabs 90 and 94 are interconnected by conductor wire 116 from which is led one output conductor wire 118, and the conductor tabs 92, 96 are interconnected by conductor wire 120, from which is led the other output conductor wire 122. As will be apparent, upon a given loading of the beam 34 (such as in the manner diagrammatically exaggerated in FIG. 4), the electroconductive elements 82, 84 are compressionally stressed, and the electroconductive elements 86, 88 are tensionally stressed, with the stress induced change in resistance of these respective elements being electrically additive in the bridge circuit shown.

Design considerations with respect to the basic form of assembly shown in FIGS. 1–3 are discussed below, using symbols as shown in FIG. 4.

The linear theory for small deflections is derivable by adding the effects of lateral force F and moment $M_0$ exerted by the lever arm on half of the flexural beam.

In this respect:

$$F = \frac{3M_0}{l} \frac{1+2\frac{d}{l}}{1+\frac{3}{2}\frac{d}{l}} \tag{1}$$

Lateral displacement at any point $x$ is:

$$y = \frac{M_0}{2EI}\left[\frac{1}{2}\frac{1+3\frac{d}{l}}{1+\frac{3}{2}\frac{d}{l}}x^2 - \frac{1}{l}\frac{1+2\frac{d}{l}}{1+\frac{3}{2}\frac{d}{l}}x^3\right] \tag{2}$$

Displacement at $x = l/2$ is:

$$y_0 = \frac{M_0 l^2}{16EI} \frac{\frac{d}{l}}{1+\frac{3}{2}\frac{d}{l}} \tag{3}$$

Combining Eqs. 2 and 3

$$y = y_0\left\{\left(\frac{l}{d}+3\right)\frac{4x^2}{l^2} - \left(\frac{l}{d}+2\right)\frac{8x^3}{l^3}\right\} \tag{4}$$

The moment M at any point $x$ is:

$$M = M_0\left[3\frac{x}{l}\frac{1+2\frac{d}{l}}{1+\frac{3}{2}\frac{d}{l}} - \frac{1}{2}\frac{1+3\frac{d}{l}}{1+\frac{3}{2}\frac{d}{l}}\right] \tag{5}$$

Surface fiber stress at any point $x$ is:

$$s = \frac{M_0 t}{2I}\left[3\frac{x}{l}\frac{1+2\frac{d}{l}}{1+\frac{3}{2}\frac{d}{l}} - \frac{1}{2}\frac{1+3\frac{d}{l}}{1+\frac{3}{2}\frac{d}{l}}\right] \tag{6}$$

Surface fiber stress at $x = l/2$ is:

$$S = \frac{M_0 t}{2I} \tag{7}$$

Angular deflection is:

$$\theta = \frac{M_0 l}{8EI} \frac{1}{1+\frac{3}{2}\frac{d}{l}} \tag{8}$$

Summing moments on the lever arm:

$$WL = 2M_0 + Fd = 2M_0\left[\frac{1+3\frac{d}{l}+3\frac{d^2}{l^2}}{1+\frac{3}{2}\frac{d}{l}}\right] \tag{9}$$

Substituting $M_0$ from Eq. 9 in Eq. 7 the maximum stress is:

$$S = \frac{WLt}{4I}\left[\frac{1+\frac{3}{2}\frac{d}{l}}{1+3\frac{d}{l}+3\frac{d^2}{l^2}}\right] \tag{10}$$

Displacement Z at the point of application of load is:

$$Z = L\theta = \frac{WlL^2}{16EI}\left(1+3\frac{d}{l}+3\frac{d^2}{l^2}\right)^{-1} \tag{11}$$

Stiffness is:

$$K = \frac{16EI}{lL^2}\left(1+3\frac{d}{l}+3\frac{d^2}{l^2}\right) \tag{12}$$

For simplicity all formulas are based on uniform thickness. As discussed below in connection with FIG. 5, some taper in the beam flexural segments is often desirable to increase output range, in which case taper configurations to suit particular needs can readily be determined emperically.

Of particular interest to certain specialized applications are designs in which stiffness K and displacement Z are prescribed, with S dictated by the desired output. To obtain equations which can be solved directly for $l$ and $t$ under such conditions, W is eliminated between Eqs. 10 and 11 and $l$ is substituted from Eq. 12, getting:

$$t^2 = 3\frac{KZ}{Sb}\frac{1+\frac{3}{2}\frac{d}{l}}{6+3\frac{d}{l}+3\frac{d^2}{l^2}}L \tag{13}$$

$$l^2 = 48E^2\frac{KZ^3}{S^3 b}\frac{\left(1+\frac{3}{2}\frac{d}{l}\right)^3}{1+3\frac{d}{l}+3\frac{d^2}{l^2}}L \tag{14}$$

The factors dependent on $d/l$ are tabulated below:

TABLE 1

| $d/l$ | $\dfrac{1+\frac{3}{2}\frac{d}{l}}{1+3\frac{d}{l}+3\frac{d^2}{l^2}}$ | $\dfrac{\left(1+\frac{3}{2}\frac{d}{l}\right)^3}{1+3\frac{d}{l}+3\frac{d^2}{l^2}}$ |
|---|---|---|
| 0 | 1 | 1 |
| .25 | .710 | 1.342 |
| .50 | .538 | 1.649 |
| .75 | .430 | 1.944 |
| 1.00 | .357 | 2.232 |

Stiffness can be high as desired. For very low stiffness the problem is to manufacture and handle very thin flexures without wrinkling. Hence, design considerations should aim to maximize $t$. The width $b$ is material only linearly and is limited by the space required for gages, so contributes little to design flexibility. Bearing in mind then that K, Z, S and $b$ are usually established by specifications, Eq. 13 and Table 1 show that $d/l$ is to be kept as small as possible consistent with adequate lever arm stiffness. Finally, L can be made as large as necessary to bring $t$ to whatever minimum acceptable value has been selected. There is presumably a practical upper limit to L, and therefore a corresponding practical lower limit as to beam stiffness. Eq. 14 shows that small $d/l$ and large L which make the flexural segment thicker, also make it shorter.

FIG. 5 illustrates a modified form of doubly inflected clamped beam assembly according to the invention. One design limitation with respect to a fully clamped beam wherein the length of the beam is maintained precisely constant under stress is that the stretching of the beam may limit the range of linearity of the mechanism rather severely. To extend the range of linearity of the mechanism, the modified form of assembly fragmentarily shown in FIG. 5 comprises respective recessed or notched regions generally indicated at 120, 122 near the roots of clamp arms 16′, 18′, which provide respective clamp arm portions 124, 126 of materially reduced thickness dimension adjacent the juncture of such arms with the base portion 14′ of frame 12′. Said reduced thickness portions 124, 126 function to permit a limited degree of flexure of the clamp arms 16′, 18′ toward each other upon substantial inflection of the beam 34 (the construction of this modified form of assembly being otherwise like that shown in FIGS. 1–3 except as above discussed). With the reduced thickness segments 124, 126 in effect relieving the stretch induced nonlinearity of the beam, but not materially affecting the inflection generated stresses therein, the range of load through which the response of the assembly is essentially linear can be materially increased.

FIG. 6 illustrates another modified form of construction, by which the operational range of assemblies according to the present invention can be substantially increased. In FIG. 6, the change in construction from the form of assembly shown in FIGS. 1–3 involves configuring the flexural segments 44′, 46′ of the clamped beam 34′ to have a slightly greater thickness dimension in the portions of these segments adjacent to the relatively rigid central boss 38′. Specifically, the inner surfaces of said flexural segments 44′, 46′ are configured to be of substantially uniform, relatively thin dimension in respective outer portions 130, 132 and to have respective inner surfaces 134, 136 which extend at small acute angles with respect to the gage mounting surface 36 and provide tapered portion of the flexural segments 44′, 46′. With the beam segarea of juncture thereof with the boss 38′. These relatively tapered segment portions, bounded by the surfaces 134, 136 and the opposite surface portions of the gage mounting surface 36 are progressively relatively stiffer toward the boss 38′. From FIG. 3 it will be recalled that the various electroconductive elements 82–88 overlie these portions of the flexural segments 44′, 46′. With the beam segments having a tapered configuration as shown in FIG. 6, all portions of the electroconductive elements 82–88 closer to the boss 38′ are stressed more nearly equally than is the case when the flexural segments are of uniform thickness dimension throughout (i.e. as characteristic of segments 44, 46 in FIGS. 1–3).

It is a characteristic of the form of the invention shown in FIGS. 1–3 that maximum stress occurs in the electroconductive elements 82–88 immediately at the inboard root of the flexural segments 44, 46, so that the maximum loading which can be tolerated by this arrangement is limited by the maximum stress capability of the inboard end portions of the elements 82–88. However, with these root areas of tapered configuration, such as provided in the construction shown at FIG. 6, and with a given maximum stress capability in the electroconductive elements 82–88, the average loading and resultant stress can be increased materially by utilizing flexural segments of increased thickness dimension adjacent to the boss.

It will be understood that various further modifications may be made in the construction of the disclosed assemblies, consistent with the basic mode of operation characteristic of the present invention. Thus, by way of further typical example, the rigid lever arm 50 can be configured to have a single arm passing through an aperture in the frame base portion 20. Also, the rigid lever arm 50 can readily have an angular (e.g. right angle) rather than straight configuration, extending around or through one of the support arms 28, 30. With a right angle configuration, the end of the lever arm receiving the applied force is disposed to oppositely inflect the strain gage mounting surface responsive to force applied generally perpendicularly of the gage mounting surface, rather than parallel thereto as in the case in the embodiments of the invention shown at FIGS. 1–3, 5 and 6. The illustrated forms of construction are considered as preferable, however, since the moment developed by a straight lever arm acts about a line essentially in the plane of the beam and produces an essentially symmetrical stress pattern in the beam, while the moment developed by an angular lever arm also includes a component which acts perpendicularly of the beam, and results in a non-symmetrical stress pattern.

From the foregoing, various further modifications, adaptations and constructional arrangements characteristic of the invention will be apparent to those skilled in the art to which the invention is addressed, within the scope of the following claims.

What is claimed is:
1. A strain gage assembly, comprising:
 (a) a flexured beam having essentially rigid support means at each end thereof and including an essentially planar strain gage mounting surface;
 (b) a boss disposed generally centrally of said beam on the beam surface opposite said mounting surface, said boss being of substantially greater thickness than said beam and providing separated flexural beam portions on opposite sides of said boss;
 (c) an insulative substrate bonded to said strain gage mounting surface, and a plurality of strain sensitive electroconductive elements bonded to said insulative substrate and overlying areas of said flexural beam portions which are immediately adjacent to said boss;
 (d) lever arm means rigidly connected to said boss; and
 (e) loading means for moving said lever arm means in a direction twisting said boss and oppositely inflecting the separated flexural portions of said beam, thus producing opposite stress patterns in the strain sensitive electroconductive elements at opposite sides of said boss.

2. A strain gage assembly according to claim 1, wherein the flexural portions of said beam are of substantially uniform thickness dimension throughout.

3. A strain gage assembly according to claim 1, wherein the flexural portions of said beam are relatively thicker in the area of juncture thereof with said relatively rigid central portion, to essentially equalize the extent of strain induced in various portions of the overlying strain sensitive electroconductive elements and thereby increase the extent of strain to which the flexural beam portions and the electroconductive elements bonded thereto can be subjected within the elastic limits thereof.

4. A strain gage mounting assembly according to claim 1, wherein said support means for the beam comprises spaced apart support arms in turn affixed to a rigid base portion in spaced relation to said beam, and said support arms and said base portion are characterized by a thickness dimension at least about three times the thickness dimension of the flexural portions of said beam.

5. A strain gage mounting assembly according to claim 1, wherein said support means for the beam comprises spaced apart support arms in turn affixed to a rigid base portion in spaced relation to said beam, and said support arms include portions of reduced thickness dimension near the juncture of said arms with said rigid base portion, which arm portions of reduced thickness dimension enable slight flexure of said support arms under conditions of high strain in said beam, such arm flexure reducing the inflection induced tensioning of said beam and thereby increasing the maximum loading to which the assembly can be subjected and still have a response characteristic wherein extent of strain induced in the flexural portions of the beam is substantially linearly proportional to the force applied to said lever means.

6. A strain gage assembly according to claim 1, further comprising movement restrictive stop means provided in said support means for limiting the extent of movement of said lever arm means.

7. A strain gage assembly according to claim 1, wherein said support means and said beam are integrally formed from a single body of metal.

8. A strain gage assembly, comprising:
(a) a flexured beam having essentially rigid clamp means at each end thereof and including an essentially planar strain gage mounting surface;
(b) a rigid boss disposed generally centrally of said beam on the beam surface opposite said mounting surface, said boss being of substantially greater thickness than said beam and delineating separated flexural beam portions on opposite sides of said boss;
(c) an insulative substrate bonded to said strain gage mounting surface, and a plurality of strain sensitive electroconductive elements bonded to said insulative substrate and overlying flexural beam portions on opposite sides of said boss;
(d) generally U-shaped lever arm means having a pair of extension arms each rigidly affixed to a respective side face on said boss means, said extension arms extending outwardly past and around a rigid base portion in spaced relation to said beam; and
(e) loading means for moving said lever arm means in a direction twisting said boss about an axis lying substantially in and extending transversely of said beam, to oppositely inflect the separated flexural portions of said beam and produce opposite stress patterns in the strain sensitive electroconductive elements at opposite sides of said boss.

9. A strain gage assembly according to claim 8, wherein the flexural portion of said beam are of substantially uniform thickness dimension throughout.

10. A strain gage assembly according to claim 8, wherein the flexural portions of said beam are relatively thicker in the area of juncture thereof with said boss, to essentially equalize the extent of strain induced in various portions of the overlying strain sensitive electroconductive elements and thereby increase the extent of strain to which the flexural beam portions and the electroconductive elements bonded thereto can be subjected within the elastic limits thereof.

11. A strain gage mounting assembly according to claim 8, wherein said clamp means for the beam comprises spaced apart support arms in turn affixed to the said rigid base portion in spaced relation to said beam, and said support arms and said base portion are characterized by a thickness dimension at least about three times the thickness dimension of the flexural portions of said beam.

12. A strain gage mounting assembly according to claim 9, wherein said clamp means for the beam comprises spaced apart support arms in turn affixed to a rigid base portion in spaced relation to said beam, and said support arms include portions of reduced thickness dimension near the juncture of said arms with said rigid base portion, which arm portions or reduced thickness dimension enable slight flexure of said support arms under conditions of high strain in said beam, such arm flexure reducing the inflection induced tensioning of said beam and thereby increasing the maximum loading to which the assembly can be subjected and still have a response characteristic wherein extent of strain induced in the flexural portions of the beam is substantially linearly proportional to the force applied to said lever arm means.

13. In a strain gage, a flexural member in the form of a beam having relatively thin flexural segments separated by a relatively rigid central portion with one surface of said beam segments and central portion being substantially planar when in the non-stressed condition; structural means integral with and substantially clamping the ends of said beam; rigid lever means extending from such beam central portion; strain sensitive electroconductive means insulatively bonded to said planar surface and overlying the portions of said flexural segments immediately adjacent to said boss; means connecting said electroconductive means in a Wheatstone bridge circuit; and means for deflecting the end of said lever means to apply a moment to and oppositely inflect said beam, inducing tensional strain in the electroconductive means overlying one such flexural segment and inducing compressional strain in the electroconductive means overlying the other such flexural segment.

14. A strain gage assembly according to claim 13, wherein the flexural segments of said beam are of substantially uniform thickness dimension throughout.

15. A strain gage assembly according to claim 13, wherein the flexural segments of said beam are relatively thicker in the area of juncture thereof with said relatively rigid central portion, to essentially equalize the extent of strain induced in various portions of the overlying strain sensitive electroconductive means and thereby increase the extent of strain to which said flexural segments and the electroconductive means bonded thereto can be subjected within the elastic limits thereof.

16. A strain gage mounting assembly according to claim 13, wherein the structural means integral with and substantially clamping the ends of said beam comprises spaced apart support arms in turn affixed to a rigid base portion in spaced relation to said beam, and said support arms and said base portion are characterized by a thickness dimension at least about three times the thickness dimension of the flexural segments of said beam.

17. A strain gage mounting assembly according to claim 13, wherein the structural means integral with and substantially clamping the ends of said beam comprises spaced apart support arms in turn affixed to a rigid base portion in spaced relation to said beam, and said support arms include portions of reduced thickness dimension near the juncture of said arms with said rigid base portion, which arm portions of reduced thickness dimension enable slight flexure of said support arms under conditions of high strain in said beam, such arm flexure reducing the inflection induced tensioning of said beam and thereby increasing the maximum loading to which the assembly can be subjected and still have a response characteristic wherein extent of strain induced in the flexural segments of the beam is substantially linearly proportional to the force applied to said lever means.

References Cited

UNITED STATES PATENTS

| 2,403,952 | 7/1946 | Ruge | 73—88.5 XR |
| 2,484,761 | 10/1949 | Stock | 73—88.5 XR |
| 2,848,892 | 8/1958 | Hoffman | 73—88.5 XR |
| 3,242,449 | 3/1966 | Stedman | 338—4 |
| 3,269,184 | 8/1966 | O'Connor | 73—313 XR |
| 3,354,716 | 11/1967 | Wiebe et al. | 73—398 XR |

CHARLES A. RUEHL, Primary Examiner.

U.S. Cl. X.R.

338—5